United States Patent
Sebestyen

(10) Patent No.: US 6,233,324 B1
(45) Date of Patent: May 15, 2001

(54) METHOD AND ARRANGEMENT FOR TRANSMITTING AUDIO SIGNALS BETWEEN COMMUNICATION TERMINAL EQUIPMENT

(75) Inventor: Istvan Sebestyen, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/492,912

(22) Filed: Jun. 20, 1995

(30) Foreign Application Priority Data

Jun. 20, 1994 (DE) ................................. 44 21 481

(51) Int. Cl.$^7$ .................................................. H04M 11/00
(52) U.S. Cl. .................................. 379/100.17; 379/93.08; 358/434; 370/282
(58) Field of Search ................................. 379/90, 93, 94, 379/96–98, 100, 90.01, 93.01, 93.05–93.11, 93.14, 93.26–93.281, 100.01, 100.12–100.17; 358/400, 434–439, 442, 443, 468; 370/110.1, 112, 84, 282, 464, 546

(56) References Cited

U.S. PATENT DOCUMENTS

| | | |
|---|---|---|
| 5,142,568 | 8/1992 | Ogata et al. . |
| 5,323,398 * | 6/1994 | Wake et al. ........................ 358/434 |
| 5,335,225 * | 8/1994 | Brax ................................. 370/84 |
| 5,513,212 * | 4/1996 | Bremer .............................. 358/434 |
| 5,517,323 * | 5/1996 | Propach et al. .................... 358/434 |

FOREIGN PATENT DOCUMENTS

| | | |
|---|---|---|
| 42 04 473 A1 | 8/1993 | (DE) . |
| 0 473 116 A2 | 3/1992 | (EP) . |
| 0 532 209 A3 | 3/1993 | (EP) . |
| 2 268 358 | 1/1994 | (GB) . |

* cited by examiner

Primary Examiner—Wing F. Chan
(74) Attorney, Agent, or Firm—Schiff Hardin & Waite

(57) ABSTRACT

A method and arrangement for transmitting audio signals from one communication terminal equipment (KES) via a communication network to another communication terminal equipment (KEE) using the facsimile transmission protocol of ITU-T.T4 and ITU-T.T.30, has the following method steps: a digital input audio signal is compressed in the sending communication terminal equipment (KES); the compressed audio signal is divided into data frames according to ITU-T.T.4 Annex A and ITU-T.T.30 Annex A; every data frame is identified as an audio information data frame (ACD, SCD); the audio information data frames (ACD, SCD) are transmitted from the sending communication terminal equipment (KES) to the receiving communication terminal equipment (KEE) using the facsimile transmission protocol and are stored in the latter; and the stored audio information data frames are output as digital audio signal after application of a decompression method or are further-processed.

9 Claims, 4 Drawing Sheets

METHOD AND ARRANGEMENT FOR TRANSMITTING AUDIO SIGNALS BETWEEN COMMUNICATION TERMINAL EQUIPMENT

BACKGROUND OF THE INVENTION

The terminal equipment of facsimile group 3 connectable to a communication network via analog interfaces are mainly used for the transmission of digital still images. The still pictures to be communicated via the telecommunication networks are composed of a great plurality of minute black and white mosaic squares having the same shape and size (called pixels). The original still pictures are either scanned by a scanner and resolved into black or white pixels or are generated by a computer as a result of a document/graphics production. The pixels are converted into digital code in the transmitting facsimile terminal equipment. First, they are compressed in order to reduce the quantity of information to be transmitted and, then, they are divided into information data frames and communicated block-by-block over the telecommunication network. In the receiving facsimile terminal equipment, the received information are decompressed and decoded into the original black and white pixels, an image being thus composed that is similar to the original (and is therefore displayed as a "facsimile" thereof). The receiver terminal equipment usually prints the received image out on paper or displays it in some instances on a display picture screen or stores it on local, digital storage equipment such as on a magnetic disk.

Instead of or in addition to the pixel-coded image, it is also optimally possible with terminal equipment of facsimile group 3 to send character-coded information. This service referred to as mixed mode has to operating modes, namely character-coded communication of texts and pixel-coded communication of images. It is suitable, for example, for economical transmission of letters with a letterhead and signature in fax format and with text in text format.

The described mixed mode is enabled by identifying the individual information data frames in a facsimile control field defined according to ITU-T T.4.Annex E. It is also known to send general computer data files.

The method employed by terminal equipment of facsimile group 3 has been standardized in the corresponding ITU-T recommendations for group 3 (ITU-T T.4, CCITT T.6, ITU-T T.30) (last revision 1994) according to the international telecommunication union (ITU).

SUMMARY OF THE INVENTION

It is an object of the present invention to provide a simple method for audio signal transmission via a communication network that can be simply realized and that enables the realization of auxiliary communication services regardless of whether the communication terminal equipment are connection to the communication network via analog or digital interfaces.

In general terms the present invention is a method for transmitting audio signals from one communication terminal equipment via a communication network to another communication terminal equipment using a facsimile transmission protocol of ITU-T.T.4 and ITU-T.T30. A digital input audio signal is compressed in the sending communication terminal equipment. The compressed audio signal is divided into data frames according to ITU-T.T4 Annex A and ITU-T.T30 Annex A. Every data frame is identified as an audio information data frame. The audio information data frames are transmitted from the sending communication terminal equipment to the receiving communication terminal equipment using the facsimile transmission protocol and are stored in the receiving communication terminal equipment. The stored audio information data frames are output as digital audio signal after application of a decompression method or are further-processed.

In the data transmission the transmission duration of the compressed audio signals is shorter than the duration of the digital input audio signal dependent on the data frame transmission rate between the communication terminal equipment.

The audio signal is a voice signal.

Identification as an audio information data frame is undertaken in the facsimile control field defined according to ITU-T.T4 Annex E. An identification is provided for audio information data frames and an identification is also provided for voice information data frames. The audio information data frames are transmitted in a mixed mode alternating with appropriately identified written character information data frames, being transmitted from the sending communication terminal equipment to the receiving communication terminal equipment. Facsimile information data frames are transmitted alternating with information data frames of this type in mixed mode, being transmitted from the sending communication terminal equipment to the receiving communication terminal equipment.

The use of the facsimile transmission protocol according to ITU-T.T4 and ITU-T.T30 includes the error correction mode according to ITU-T.T4 Annex A and ITU-T.T30 Annex A.

The present invention is also an arrangement for the implementation of the method described above and has a communication network, as well as of sending communication terminal equipment and receiving communication terminal equipment, that respectively have at least the standard telephone terminal equipment. The communication terminal equipment also have a communication control means for controlling the data transmission using the facsimile transmission protocol and have at least one fax modem. At least the sending communication terminal equipment also has an audio coding means for compressing the audio input digital signal. At least the receiving communication terminal equipment has an audio decoding means for decompression of the received audio information data.

The present invention is also a facsimile apparatus for the implementation of the method described above having an image scanner means, a printer means, a modem, a communication controller and a facsimile coding/decoding means, as well as an audio input/output means. The facsimile apparatus also has an audio signal coding/decoding means for the compression and decompression of audio input/output signals.

The identification of the data frames to be transmitted as audio information data block or voice information data block in the facsimile control field defined according to ITU-T T.4.Annex E enables a mixed mode wherein voice/audio information alternate at least block-by-block but can be transmitted within one transmission procedure together with facsimile information and/or written character information.

As a result thereof, audio information and image information can be transmitted in common not only via a digital telephone network but also via an analog telephone network.

When real-time transmission can be foregone, a bidirectional information exchange is possible given employment of the inventive method in both directions—usually with a respectively renewed call setup.

Given bidirectional information exchange upon employment of the inventive method, the call address of the terminal equipment initiating a call setup and that is usually communicated within the framework of the signaling to the called terminal equipment can be stored in the calling terminal equipment in an especially beneficial embodiment of the invention and can be employed in the setup of a call-back by the previously called terminal equipment.

For realizing an inventive method, it is proposed to send a digitally compressed and coded voice or audio information in the information stream usually transmitted between facsimile terminal equipment instead of the pixel-coded image or in addition thereto.

Individual embodiments of the invention, dependent on the individual embodiment, make use of some of the special characteristics of facsimile group 3 recited below:

the optional error correction mode (ECM) of the facsimile group 3 introduced in 1988 (ITU-T T.4 Annex A, ITU-T T.30 Annex A) enables error-free transmission of facsimile information frames with a size of 64 (or 256) octets.

increasing the transmission speeds of the facsimile group 3 by optionally attaching high-speed modems (up to 30 kbit/s).

the optional mixed mode (MM) for facsimile group 3 introduced in 1992 (ITU-T T.4 Annex E, ITU-T T.30) distinguishes between facsimile coded data frame (FCD) and character-coded data frame (CCD) in combination with the above-described facsimile information frames.

the current norming of voice-coding with extremely low bit rates for picture telephony in the public dialed telephone network in ITU-T leads to a more or less good voice coding (approximately CCITT G.726) with transmission speed of 5–7 kbit/s that require a transmission type HDLC LAP similar to the described HDLC in ITU-T T.4 Annex A and ITU-T T.30 Annex A.

Upon involvement of the aforementioned features as needed, the methods described in the current ITU-T recommendations can be expanded such that the above-described, required functionality (transport of audio/voice via facsimile protocols of group 3) can be effectively met.

An inventive method, for example, enables the simple realization of "voice mail phones", i.e. telephone terminal equipment having voice mail application, upon employment of communication protocol of facsimile group 3 expanded at least by the identifier of audio information frames given employment of analog subscriber network interfaces.

In addition to ordinary telephony, a voice or audio message can be transmitted in this application from transmitter to receiver (or to a plurality of receivers in the case of a "facsimile broadcast"). Dependent on the audio/voice compression strategy employed, voice and/or audio messages can be transmitted with different audio quality.

A special advantage of the invention is that a shortening of the transmission times by the factor 4 compared to the transmission times for normal calls can be achieved given temporal compression of the audio information up to the factor 4 as a consequence of the transmission of a real-time audio information of, for example, 7 kbit/s via facsimile group 3 with the public switched telephone network (PSTN-public switched telephone network) with modems having a high transmission rate of, for example, 28–30 kbit/s. For example, the actual transmission duration of a facsimile voice memory service message communicated between Europe and Australia, which would use four minutes under normal call conditions, can be reduced to one minute. The highly compressed facsimile voice memory service messages are also well-suited for compact digital storage. In the above-recited example, one minute of voice would occupy approximately 52 kbyte of memory space on a "voice mail server". A specific data compression/decompression circuit for the voice signal memory can thus be eliminated.

Another advantage of the invention is that audio signals of higher quality can be transmitted with the assistance of the inventive method, for example with the help of the audio compression method developed by ITU-TSG 15 and ISO/IEC JTC1 SC29.

The invention also enables the transmission of voice-commented, pixel-coded or character-coded facsimile messages. In this application, a written facsimile message can be commented by a spoken message that, for example, offers an introduction or an additional explanation or that can serve as spoken commentary about the individual paragraphs of a received facsimile message.

Over and above this, the invention enables the realization of a "limited multimedia-capable facsimile". Within certain limits, the proposed technique enables the synchronization of different presentation media: for example, the facsimile-coded of character-coded text can be "simultaneously" accompanied by voice annotation. For instructional purposes, thus, a message written in French can be accompanied by correctly pronounced French.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
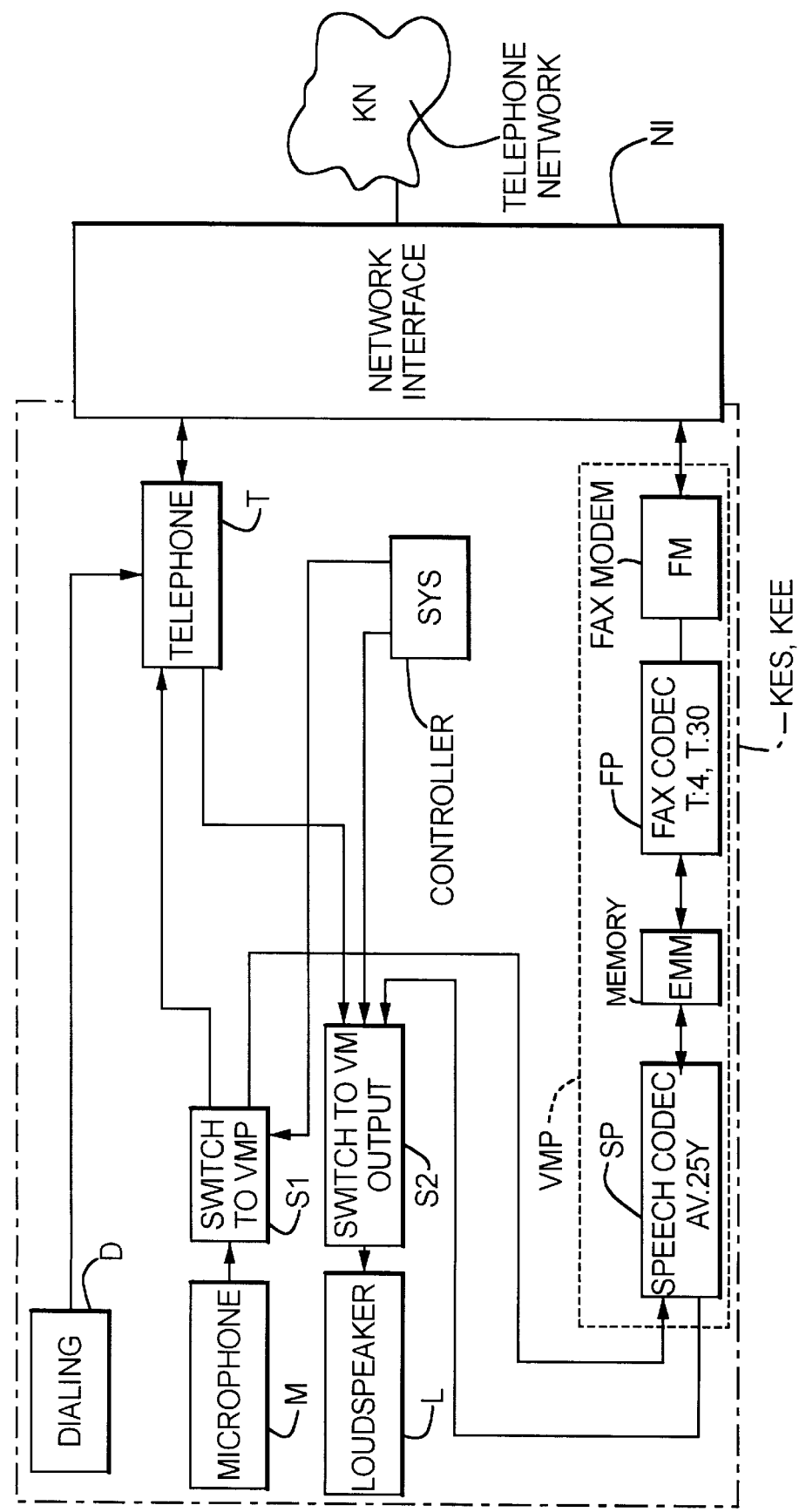
FIG. 1 is a block illustration of a communication terminal equipment KES, KEE for realizing a voice mail connection ("voice mail phone")

The elements of facsimile group 3 that have been standardized or are to be standardized in future and are recited below are preferably employed:

Modems of the facsimile group 3 having a higher transmission speed according to CCITT V.29 (9600 bit/s and below), V.17 and V.33 (14000 bit/s and below), a "VERY high speed facsimile modem", such as V.34 (28000–32000 bit/s and below).

The optional error correction mode (ECM) of facsimile group 3 (ITU-T T.4 Annex A, ITU-T T.30 Annex A) introduced in 1988 that enables the error-free transmission of facsimile information frames having a size of 64 (or 256) octets.

The optional mixed mode for facsimile group 3 (ITU-T T.4 Annex E, ITU-T T.30) introduced in 1992 that distinguishes between facsimile-coded data frame (FCD) and character-coded data frame (CCD), in conjunction with the above-described facsimile information frames. This is to be expanded by audio-coded data frames (ACD-audio coded data) and/or by voice-coded data frames (SCD-speech coded data).

Smaller, compressed speech frames (CSB) that are not discussed in greater detail in this application are packed, for example, into a voice-coded data frame ("data frame") having a length of, for example, 64 or 256 octets:

For example:
in a 64 octet data frame=more than 2 CSB,
in a 256 octet data frame=more than 10 CSB.

The data frames are to be successively filled with compressed speech frames CSB and, when a data frame is full, the remaining bits of the clipped, compressed speech frame CSB are respectively filled into the next data frame (frame) as the first bits. The last data frame can contain fewer than 64 or 256 octets. The error correction mode of ITU-T T.30 Annex A assures that all voice-coded data frames SCD are transmitted error-free.

The transmission of messages that contain facsimile-coded, character-coded and/or voice/audio-coded information between compatible communication terminal equipment should be enabled with an "expanded mixed mode" (EMM) for the facsimile group 3.

The entire "multimedia" facsimile message is divided into at least one "partial page" in the expanded mixed mode, as known from Annex A of ITU-T T.30. Each partial page is horizontally divided into sequentially numbered "logical slices" (from 0 through a maximum of 255) over the page, whereby each slice contains either facsimile-coded, character-coded or speech/audio-coded information. Of course, a speech/audio-coded slice would not occupy any surface area on the physical page containing the facsimile image. The transmission of slices for each page is implemented sequentially from top to bottom. One slice is respectively contained in one information data frame.

Every slice is introduced by a facsimile control field (CFC) referred to as information field identification. The first slice is either facsimile-coded, character-coded or speech/audio-coded. Following slices (also called "partial pages") are alternatively character-coded, speech/audio-coded or facsimile coded. In an especially favorable embodiment, a distinction is made between audio-coded data (ACD) and speech-coded data (SCD).

In order to distinguish between the facsimile-coded data (FCD), the character-coded data (CCD), the speech/audio-coded data (SCD) and the return to control for partial page (RCP), a code required in Annex A of ITU-T T.30), the facsimile control field (FCF) is defined as follows:
1. FCF for the FCD frame 0110 0000 (already defined by ITU-T).
2. FCF for the RCP frame 0110 0001 (already defined by ITU-T).
3. FCF for the CCD frame 0110 0010 (already defined by ITU-T).
4. FCF for an ACD frame 0110 1000 yet to be defined.
5. FCF for an SCD frame 0110 1001 yet to be defined.

The FCF code 0110 0100 is reserved for future employment of ITU-T.

The data frames in every partial page are consecutively numbered from 0 up to the maximum number of 255, regardless of whether the partial page is composed of FCD, CCD and/or SCD frames. At the end of each slice, the length of the facsimile-coded data field, the length of the character-coded data field or the length of the speech/audio-coded data field can be less than 256 or, respectively, 64 octets.

The current standardization of speech coding with a very low bit rate for videophony in the public switched telephone network in ITU-T has led to speech codecs (quality approximating CCIT G.726) having a transmission rate of 5–7 kbit/s that also requires an HDLC-LAP transmission mode, as is similarly described in ITU-T T.30. The future 12, 8 kbit/s 4-kbit/s voice coders are likewise being standardized by the ITU-T SG15, and can be used for the same purpose.

The aforementioned standards merely have to be expanded for realizing the present invention.

A few characteristics of communication terminal equipment to be provided for realizing a method of the invention are set forth in greater detail below.

For realizing a voice mail service upon employment of an inventive method, a telephone set having "voice memory" capability, what is referred to as a "voice mail phone".

In this application, a voice or audio message in addition to standard telephony can be transmitted from the sender to the receiver in a "terminal equipment-to-terminal equipment" method or can be transmitted to a plurality of receivers in a "facsimile multiaddressing" method. Dependent on the audio/speech compression strategy that is employed, voice and/or audio messages can be transmitted with different audio quality.

A typical terminal equipment for this meets at least the features of a telephone for the public switched telephone network or of a radio telephone and additionally contains a communication control means for contorting the data transmission with the assistance of the facsimile transmission protocol and at least one fax modem. At least the sending communication terminal equipment KES also contains an audio coding means for compressing the audio input digital signal and at least the receiving communication terminal equipment KEE also contains an audio decoded means for decompression of the received audio information data. FIG. 1 contains a simplified frame circuit diagram of such a communication terminal equipment KES (sender) or, respectively, KEE (receiver). A system controller SYS allows switching between the classic telephone T and the voice mail phone VMP. The other communication party is selected via the telephone T with the assistance of the dial means D or, respectively, the telephone T signals an incoming call. The switch S1 switches the microphone M to the telephone T during normal telephone calls and to the voice mail phone VMP in the voice mail phone mode. By contrast thereto, the switch S2 switches the loudspeaker/earphone L to the telephone T during normal telephone calls and switches it to the voice mail phone VMP during voice mail phone mode as output device. The voice mail phone VMP is composed of the speech codec SP, of the memory EMM particularly required for the expanded mixed mode, of the fax codec and of the fax modem FM. What is particularly understood here by fax codec is a facsimile coder/decoder according to ITU-T.4 and T.30. The speech codec SP is composed of a coder that digitizes the input speech signals coming from the microphone M via a first switch means S1 and compresses them according to ITU-T G.723 (ITU-T G.723 was earlier known as AV.25 Y), and of a decoder that receives the output speech signals from the memory EMM, decodes them and forwards them to a loudspeaker/earphone L for output as analog voice signals via a second switch means S2. The memory EMM embeds the compressed input voice signals incoming from the speech codec SP into a frame of an expanded mixed mode and stores them. When a voice mail phone message has been received, the memory EMM handles the indication about the arrival of the message. Upon output, further, the memory EMM takes the compressed output voice signals that have arrived from the frame of the expanded mixed mode and forwards them to the speech codec SP for decoding. As fax input, the fax codec takes the data from the memory EMM that had been deposited corresponding to the expanded mixed mode and forwards these to the receiving voice mail phone with the assistance of the facsimile protocols ITU-T.4 and ITU-T T.30. Given an incoming voice mail phone message, the fax codec receives the message with the assistance of the ITU-T T.4 and of the ITU-T T.30 protocols and deposits them in the memory EMM. The fax modem—according to ITU-T T.30—communicates with the fax modem of the other equipment via the network interface NI. The fax mode sees to it that the digital control signals and data of the fax codec can be exchanged via the analog telephone network KN (GSTN). The network interface NI sees to the physical matching of the fax modem and of the telephone to the telephone network KN. The analog telephone network is provided as telephone network KN.

Figure 3:
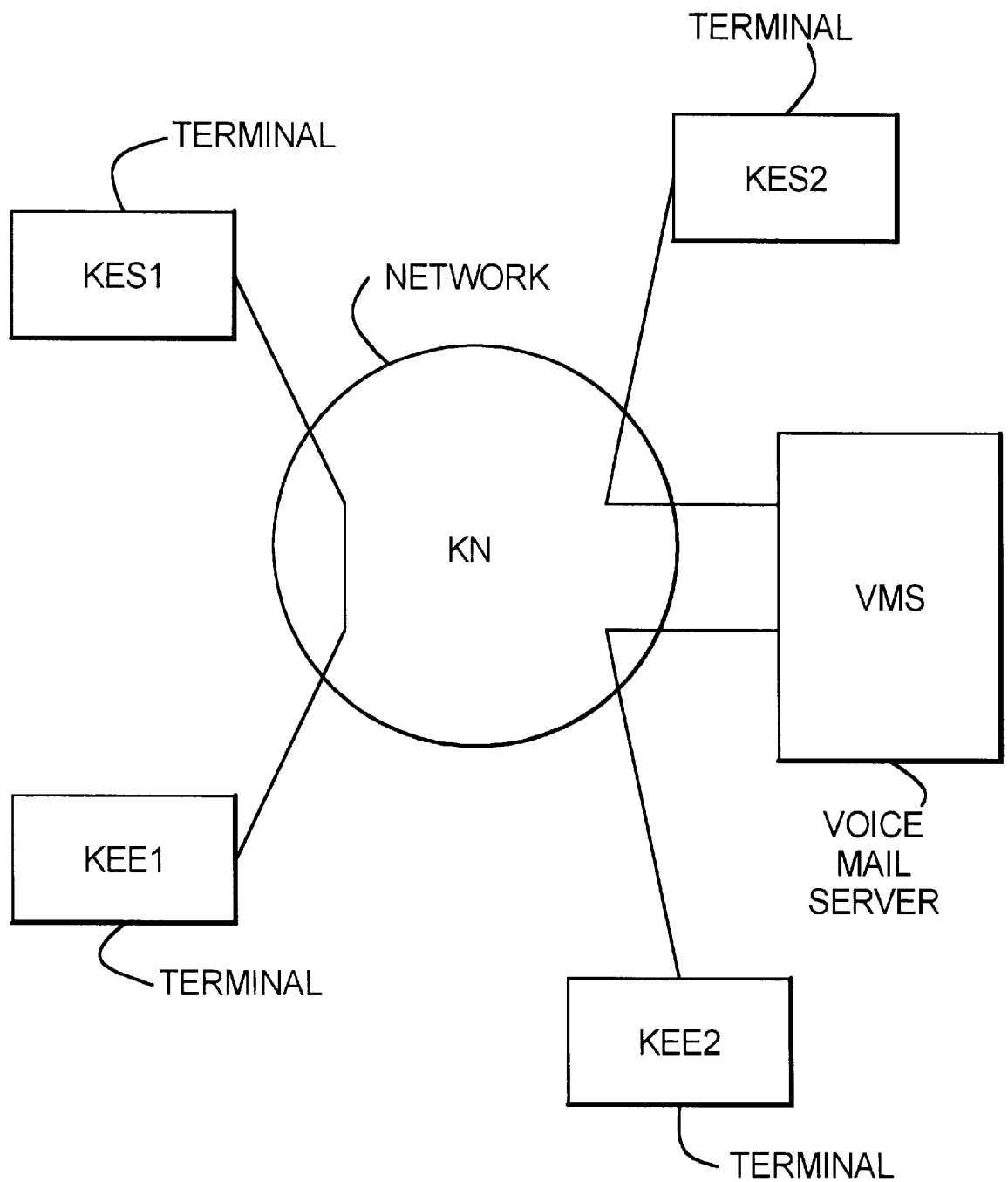
FIG. 3 depicts different types of connection between voice mail phones KES, KEE, namely directly between two voice mail phones KES1, KEE1 and between two voice mail phones KES2, KEE2 via a voice mail server VMS, which respective involvement of a communication network KN.

During the connection, the "voice mail phone" KES1 is connected either to another "voice mail phone" terminal equipment KEE1 or to a "voice mail server" VMS (FIG. 3). In this latter instance, the information transmission from the sending "voice mail phone" KES2 ensues to the "voice mail server" VMS and from the "voice mail server" VMS to the receiving "voice mail phone" KEE2.

Figure 2:
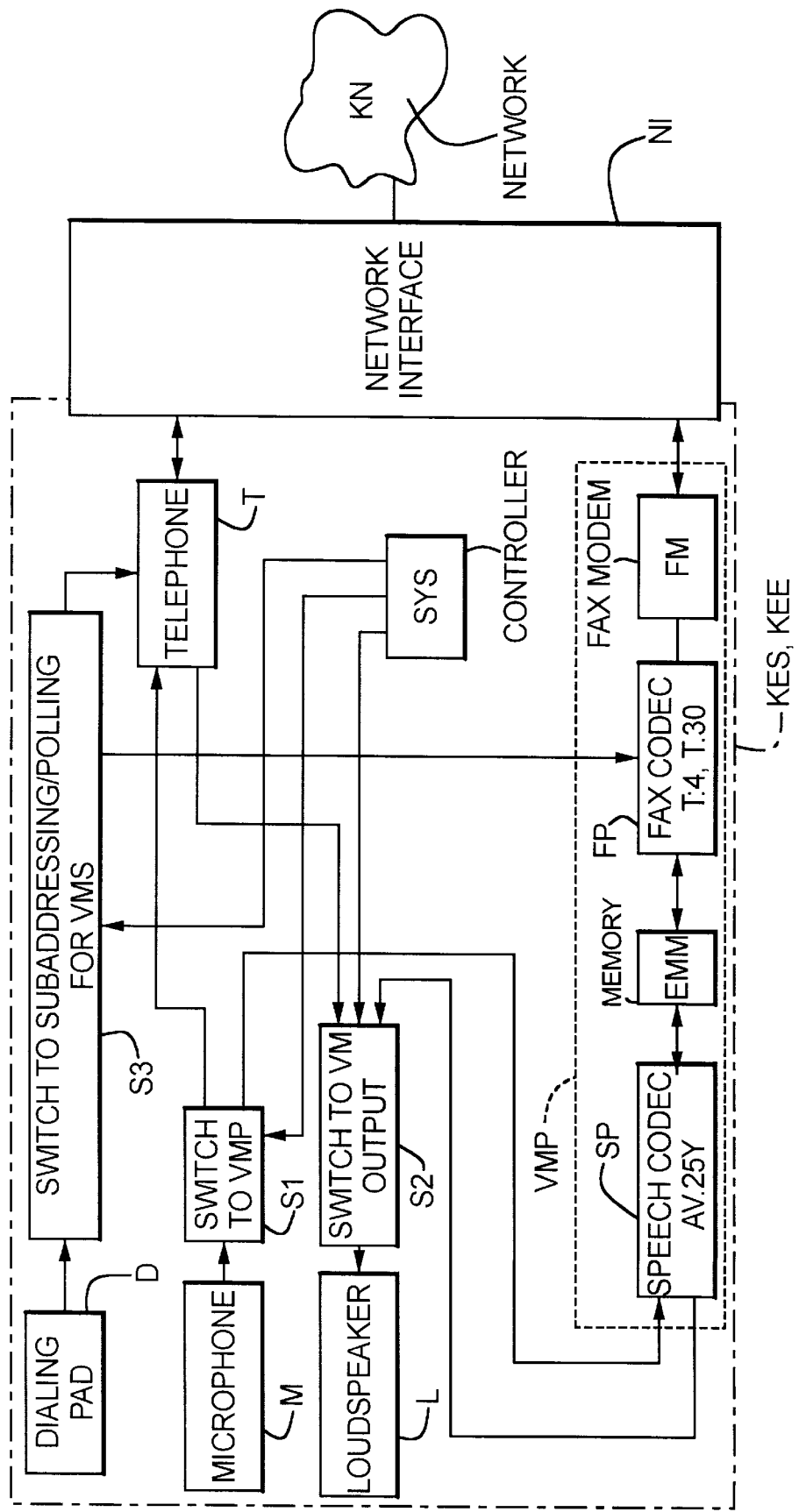
FIG. 2 is a block presentation of a communication terminal equipment KES, KEE of FIG. 1, with additional possibility of accessing a voice mail server.

FIG. 2 shows the simplified frame circuit diagram of the voice mail phone KES (sender) or, respectively, KEE (receiver) communicating with a voice mail server VMS. The system in FIG. 2 contains the system of FIG. 1 with the following additions: when sending a message from the voice mail phone KES to the voice mail server VMS, the switch S3 serves the purpose of being able to input the "address" of the designation voice mail phone KEE to the fax codex via the dial means D for forwarding to the voice mail server VMS with the assistance of the protocols of ITU-T T.30. Upon reception of a message stored in the voice mail server VMS, the switch S3 makes it possible that the "password" for fetching can be input by the dial means D to the ITU-T T.30 protocol. This "password" is what enables the fetching of the message from the voice mail server VMS in the communication terminal equipment KEE. The voice mail server VMS is connected to the network KN.

For communication between two voice mail phones, the audio message to be transmitted is edited in the transmitting communication terminal equipment KES.

The preparation by editing the voice mail phone message is implemented "off line", i.e. before the call setup. The sending subscriber switches his communication terminal equipment KES to voice mail phone mode, lifts up the handset and speaks the message into the telephone. The message is compressed and locally stored in the transmitting communication terminal equipment KES. In a beneficial embodiment, monitoring and local editing are possible. The message length is defined by an internal memory of the telephone. A memory capacity of at least 256 kbyte should be provided (approximately five minutes of speech). After editing the message, the actual communication can occur immediately or with a pre-programmed delay, for example, in order to make use of lower nighttime rates.

The connection is set up as a connection of the facsimile group 3 (phase A of ITU-T T.30). This means that the receiving voice mail phone answers the call after a preprogrammed plurality of rings as voice mail phone if the call has not been handled by a subscriber. Potentially, a subscriber accepting a voice mail phone call can manually undertake a switching to the voice mail phone mode after monitoring the modem tones (according to ITU-T T.30).

According to phase B of ITU-T T.30, the terminal equipment characteristics of both the transmitter as well as of the receiver are exchanged in order to signal that voice mail phone communication is possible. After the "training" (i.e., definition of the line quality), the selection of the highest modem speed and modem type are implemented according to the rules of the protocol of facsimile group 3.

The actual communication between sender and receiver corresponds to phases C and D of ITU-T T.30. For voice mail phone communication, the above-described error correction mode ECM and the above-described, expanded mixed mode EMM are required. In the analog telephone network, the transmission of a given voice mail message can, compared to an ordinary telephone connection, take approximately one-fourth of the time dependent on the actual transmission rate and on the requirement for error correction. The reception of a voice mail message should be displayed at the receiving voice mail phone during reception.

After correct reception of the message, the connection is cleared down (phase E of ITU-T T.30). A display can be provided in the receiving voice mail phone in order to signal that a received voice mail message is present. Thus, the receiving subscriber can lift up his handset at any desired time, press a button and the message is decompressed and covered back into audible voice signals off-line (not connected to the telephone communication network). Via an optional, external interface (such as RS-232) at the voice mail phone having a connection to a personal computer, the received message can potentially be transmitted for storing and for further-processing. Likewise, voice mail phones can potentially connect a data terminal equipment to the communication network with such an interface or with a similar interface. Separate modems for the voice mail phone and the data terminal equipment would thereby not be required.

A further development of the present invention provides for communication between voice mail phones and a voice mail server in which a voice mail phone message can be deposited and fetched.

The preparation of the voice mail phone message is thereby fundamentally implemented in the same way as set forth above. In addition, however, the "sub-address" of ITU-T T.30, i.e. the mailbox number of the receiver, is also input, for example with the numerical keyboard of the telephone. After the message has been prepared, a call setup to the voice mail server can be immediately undertaken. For using lower nighttime rates, for example, a call setup can also be initiated with a pre-programmed delay.

The connection is thereby respectively set up as a connection of the facsimile group 3 (phase A). According to phase B of ITU-T T.30, the terminal equipment characteristics of transmitter and receiver are thereby exchanged, it thus being signaled that voice mail phone communication between the transmitting voice mail phone and the receiving voice mail server is possible (phase B). Undesired terminal equipment connections of facsimile group 3 can be potentially aborted by the server. After the "training" of the connection, the selection of the highest modem speed and of the modem type is also implemented according to the rules of the protocol of facsimile group 3.

The actual connection between transmitter and receiver corresponds to phases C and D of ITU-T T.30. Upon employment of the sub-address that has been input and that is defined according to the definitions of ITU-T T.30, the voice mail message is delivered to the "mailbox" of the receiving voice mail phone.

After correct reception of the message, the connection between the transmitting voice mail phone and the forwarding voice mail server is cleared down (phase E).

At a later point in time, the receiving voice mail phone can fetch the voice mail phone messages received by the voice mail server (phases A and B) with the corresponding protocol element "selective polling" of facsimile group 3. A voice mail phone having facsimile polling capability is required for this purpose.

After the polling of a message from the voice mail server (phases C, D, E), for example, a continuously lit red lamp can indicate that this received voice mail message is available for use. The receiving subscriber can then initiate a decompression of the message and a reconversion into audible voice signals. The receiving communication terminal equipment thereby works off-line. Via optional, external interfaces (such as RS-232) at the receiving voice mail phone having a connection to a data terminal equipment such as, for example, a personal computer, the received message can in turn be transmitted for further storing/processing.

A further application of the invention is a voice-annotated and limited multimedia facsimile. Applied examples of this are:

voice annotating of pixel-coded or character-coded facsimile messages; and limited multimedia facsimile.

In the voice annotating of pixel-oriented or character-coded facsimile messages, a written facsimile message can be commented on by a spoken communication that, for example, offers an introduction or additional explanation or provides a verbal commentary on the individual paragraphs of a received facsimile message.

"Limited multimedia facsimile" allows the synchronization of different presentation media within certain limits. For example, the facsimile-coded or character-coded text can be accompanied with voice annotation with a document or, respectively, within a shared transmission procedure.

Figure 4:
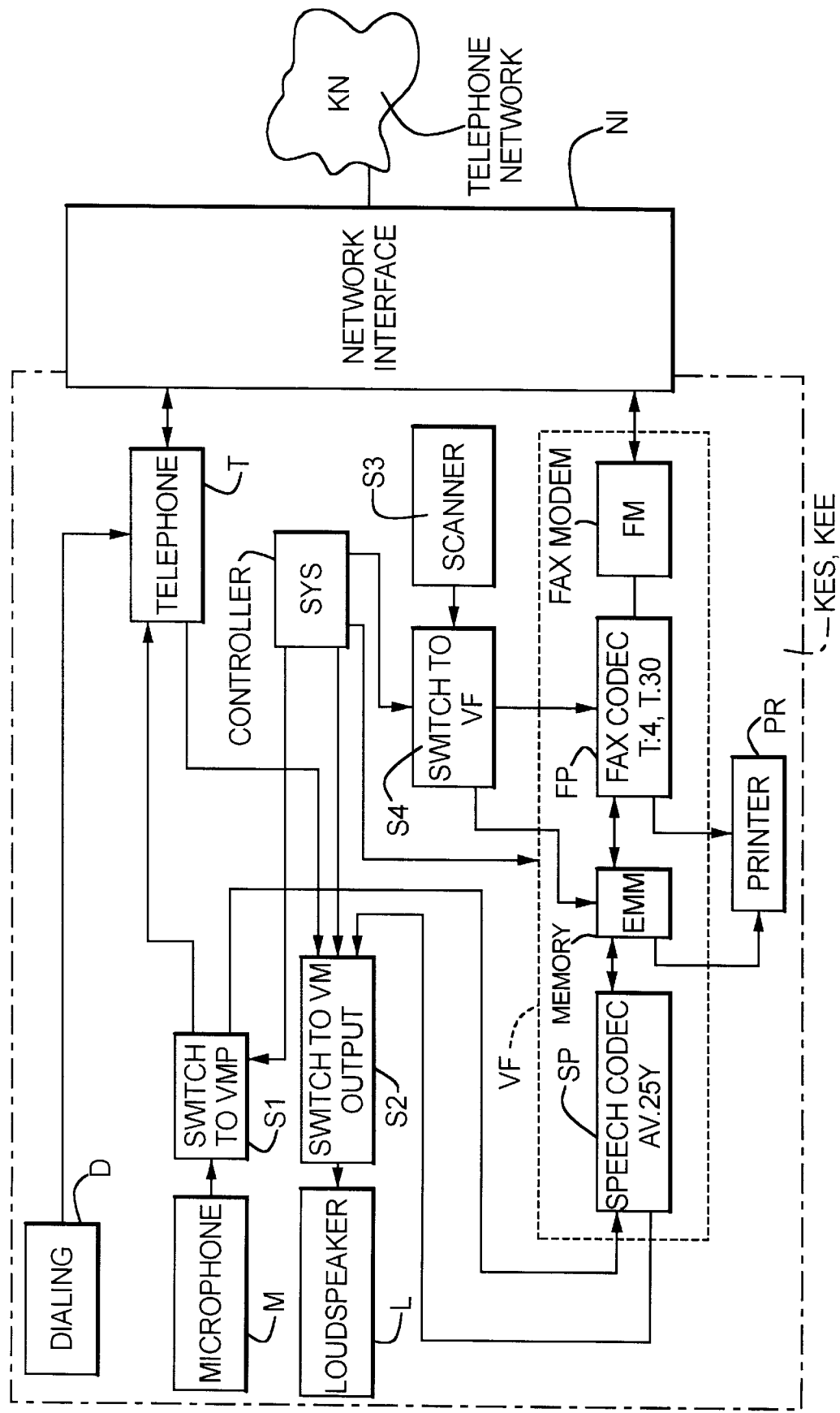
FIG. 4 is a block circuit diagram of a terminal equipment for realizing a method with shared transmission of audio information with facsimile and/or text information.

FIG. 4 shows a simplified frame circuit diagram of a communication terminal equipment KEE, KES for the implementation of a transmission method for such a multimedia facsimile.

A system controller SYS allows switching between the classic telephone T and the multimedia voice/fax VF. The other communication party is selected via the classic telephone T (with the assistance of the dial means D) or the classic telephone T signals an incoming call. The switch S1 switches the microphone M to the classic telephone T during normal telephone calls and to the multimedia voice/fax VF in the voice/fax mode. The switch S2 switches the loudspeaker/earphone L to the classic telephone T during normal telephone calls and to the multimedia voice/fax VF as output device in the voice/fax mode. The multimedia voice/fax VF is composed of the speech codec SP, of the memory EMM for an expanded mixed mode, of the fax codec FP and of the fax modem FM. The speech codec SP is composed of a coder that digitizes the input voice signals coming from the microphone M via the switch S1 and compresses them according to ITU-T G.723, and of a decoder that receives the output voice signals from the memory EMM, decodes them and forwards them to the loudspeaker/earphone L for output as analog voice signals via the switch S2. The memory EMM embeds the compressed input voice signals arriving from the speech codec SP into a frame of an expanded mixed mode and stores them. When a voice mail phone message has been received, the memory EMM manages the display regarding the arrival of the message. Further, it takes the compressed output voice signals that have been arrived from the memory EMM upon output from the frame of the expanded mixed mode and forwards them to the speech codec SP for decoding or, respectively, to the printer PR for print-out of the facsimile image. The fax codec FP takes the data that were deposited according to the expanded mixed mode from the memory EMM as fax input and forwards these to the receiving voice mail phone with the assistance of the facsimile protocols ITU-T.4 and ITU-T T.30. Given an incoming voice mail message, the fax codec FP receives the message with the assistance of the ITU-T T.4 and ITU-T T.30 protocols and deposits it in the memory EMM. According to ITU-T T.30, the fax modem FM communicates with the fax modem FM of the other equipment via the network interface NI. The fax modem FM sees to it that the digital control signals and data of the fax codec FP can be exchanged via the analog, global network (GSTN) KN. The network interface NI sees to the physical matching of the fax modem FM and of the telephone to the telephone network KN.

In its simplest form, a voice-commented message can be transmitted either as first part or as last part of an image. In this application, a microphone and a speech codec are added to the facsimile equipment. Either independent facsimile terminal equipment or those on a PC basis can be equipped with the system.

For example, the transmitting subscriber can place a brief, spoken introductory message in front of his pixel-coded "main" message in order to comment on the following, written facsimile. One advantage of such a message type is that comments not required for archiving purposes are not fixed on paper. Facsimile paper is thereby saved.

In addition to the print-out of the paper facsimile, a receiving facsimile terminal equipment equipped with a loudspeaker and a speech decoder reproduces the spoken message on demand of the subscriber.

The error correction mode ECM defined in ITU-T T.30 Annex A allows information data frame sizes of either 64 or 256. Inventively, every frame can present either facsimile-coded, pixel-coded, character-coded or speech/audio-coded information. With appropriate editing, thus, it is possible to mix said information forms with one another within a message as needed—within the given limits of the 64 or 256 octet frame as smallest instances of an information form.

The invention is not limited to the particular details of the apparatus and method depicted and other modifications and applications are contemplated. Certain other changes may be made in the above described apparatus and method without departing from the true spirit and scope of the invention herein involved. It is intended, therefore, that the subject matter in the above depiction shall be interpreted as illustrative and not in a limiting sense.

What is claimed is:

1. A facsimile apparatus for use in transmitting audio signals from one communication terminal equipment via a communication network to another communication terminal equipment using a facsimile transmission protocol of ITU-T.T4 and ITU-T.T30, comprising:

an image scanner;

a printer operatively connected to said scanner;

a facsimile coding/decoding device operatively connected to said scanner and to said printer;

a memory operatively connected to said scanner, said printer and said facsimile coding/decoding device;

a modem operatively connected between said facsimile coding/decoding device;

an arrangement for processing input/output audio signals;

a speech signal coding/decoding device for respectively compressing and decompressing said input/output speech signals, said speech signals coding/decoding device operatively connected to said arrangement and to said memory;

communication controller for controlling at least said arrangement, said speech signal coding/decoding device; said facsimile coding/decoding device and said modem;

wherein a digital input audio signal is compressed in the sending communication terminal equipment; where the compressed audio signal is divided into data frames according to ITU-T.T4 Annex A and ITU-T.T30 Annex A; wherein every data frame is identified as an audio information data frame; wherein the audio information data frames are transmitted from the sending communication terminal equipment to the receiving communication terminal equipment using the facsimile transmission protocol and are stored in the receiving communication terminal, a transmission duration of the compressed audio signals being shorter than a duration of the digital input audio signal dependent on a data frame transmission rate between the sending and receiving communication terminal equipment; and wherein the stored audio information data frames are output as digital audio signal after application of a decompression method or are further-processed.

2. A method for transmitting audio signals from a sending communication terminal equipment via a communication network to a receiving communication terminal equipment using facsimile transmission protocol ITU-T.T4 and ITU-T.T30, comprising the steps of:

compressing a digital input audio signal in the sending communication terminal equipment;

dividing the compressed audio signal into data frames according to ITU-T.T4 Annex A and ITU-T.T30 Annex A;

identifying every data frame as an audio information data frame;

transmitting the audio information data frames from the sending communication terminal equipment to the receiving communication terminal equipment using the facsimile transmission protocol and storing the received video information frames in the receiving communication terminal, a transmission duration of the compressed audio signals being shorter than a duration of the digital input audio signal dependent on a data frame transmission rate between the sending and receiving communication terminal equipment; and decompressing and outputting the stored audio information data frames as a digital audio signal.

3. The method according to claim 2, wherein the audio signal is a voice signal.

4. The method according to claim 2, wherein the method further comprises identifying the audio information data frame in a facsimile control field defined according to ITU-T.T.4 Annex E.

5. The method according to claim 4, wherein an identification is provided for audio information data frames and an identification is also provided for voice information data frames.

6. The method according to claim 4, wherein the audio information data frames are transmitted, in a mixed mode alternating with identified written character information data frames, from the sending communication terminal equipment to the receiving communication terminal equipment.

7. The method according to claim 4, wherein facsimile information data frames are transmitted, alternating with information data frames in mixed mode, from the sending communication terminal equipment to the receiving communication terminal equipment.

8. The method according to claim 2, wherein the facsimile transmission protocol according to ITU-T.T.4 and ITU-T.T30 with an error correction mode according to ITU-T.T.4 Annex A and ITU-T.T.30 Annex A.

9. An arrangement for transmitting audio signals from one communication terminal equipment via a communication network to another communication terminal equipment using a facsimile transmission protocol of ITU-T.T4 and ITU-T.T30, comprising:

a communication network connected to a sending communication terminal equipment and a receiving communication terminal equipment that respectively have at least standard telephone terminal equipment;

each of the communication terminal equipment also having a communication control means for controlling data transmission using a facsimile transmission protocol and having at least one fax modem;

at least the sending communication terminal equipment also having a speech codec means for compressing the audio input digital signal; and at least the receiving communication terminal equipment having a speech codec means for decompression of the received audio information data;

wherein a digital input audio signal is compressed in the sending communication terminal equipment; where the compressed audio signal is divided into data frames according to ITU-T.T4 Annex A and ITU-T.T30 Annex A; wherein every data frame is identified as an audio information data frame; wherein the audio information data frames are transmitted from the sending communication terminal equipment to the receiving communication terminal equipment using the facsimile transmission protocol and are stored in the receiving communication terminal, a transmission duration of the compressed audio signals being shorter than a duration of the digital input audio signal dependent on a data frame transmission rate between the sending and receiving communication terminal equipment; and wherein the stored audio information data frames are output as digital audio signal after application of a decompression method or are further-processed.

* * * * *